United States Patent
Ellerthorpe et al.

(10) Patent No.: US 6,624,607 B1
(45) Date of Patent: Sep. 23, 2003

(54) ENERGY-ABSORBING FILTER FOR A MOTOR

(75) Inventors: Scott Ellerthorpe, San Francisco, CA (US); Christopher Botka, Santa Rosa, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/715,857

(22) Filed: Nov. 17, 2000

Related U.S. Application Data

(60) Provisional application No. 60/166,517, filed on Nov. 18, 1999.

(51) Int. Cl.[7] .................................................. G05B 5/01
(52) U.S. Cl. ........................ 318/623; 318/611; 318/629; 318/685; 318/696
(58) Field of Search ............................... 318/611, 623, 318/629, 696, 685

(56) References Cited

U.S. PATENT DOCUMENTS

| | | | | |
|---|---|---|---|---|
| 3,609,487 A | * | 9/1971 | Allison | 318/138 |
| 3,800,199 A | * | 3/1974 | Weigand | 318/701 |
| 3,946,211 A | * | 3/1976 | Jenkins, Jr. | 318/611 |
| 3,999,115 A | * | 12/1976 | South et al. | 322/25 |
| 4,081,736 A | * | 3/1978 | Leenhouts et al. | 318/138 |
| 4,268,785 A | * | 5/1981 | Svendsen | 318/608 |
| 4,319,175 A | * | 3/1982 | Leenhouts | 318/696 |
| 4,591,774 A | | 5/1986 | Ferris et al. | 318/696 |
| 4,675,590 A | * | 6/1987 | Pellegrino et al. | 318/685 |
| 4,804,902 A | * | 2/1989 | Maier | 318/798 |
| 4,963,806 A | * | 10/1990 | Shinohara et al. | 318/621 |
| 5,182,685 A | | 1/1993 | Krause et al. | 360/78.13 |
| 5,459,383 A | | 10/1995 | Sidman et al. | 318/611 |
| 5,734,249 A | * | 3/1998 | Pohjalainen et al. | 318/798 |
| 6,040,676 A | * | 3/2000 | Nordquist et al. | 318/696 |
| 6,208,537 B1 | * | 3/2001 | Skibinski et al. | 363/40 |

OTHER PUBLICATIONS

Adel S. Sedra, Kenneth C. Smith "Microelelctronic circuits", New York Oxford Oxford University Press, 1998, p. 24.*

* cited by examiner

*Primary Examiner*—Rita Leykin
(74) *Attorney, Agent, or Firm*—Renner, Otto, Boisselle & Sklar, LLP

(57) ABSTRACT

An energy absorbing filter for reducing mechanical oscillations in motor is disclosed. The energy absorbing filter places a virtual shunt across the motor windings so as to dissipate mechanical vibrations as resistive losses. This is accomplished by the placing of a large capacitance in parallel with the windings. The impedance of the filter and the windings combined is purely resistive. The motor may be any kind of motor including a 2-, 3-, or 5-phase hybrid step motor. The filter may be realized as an analog or digital filter, or may be a hybrid of the two. Additionally, the filter may be realized through hardware or through software in the form of a computer program.

31 Claims, 5 Drawing Sheets

ENERGY-ABSORBING FILTER FOR A MOTOR

This application claims the benefit of Ser. No. 60/166,517 filed Nov. 18, 1999.

TECHNICAL FIELD OF THE INVENTION

The invention herein described relates generally to an energy-absorbing filter for a motor, and more particularly to a phase current compensation filter for reducing the mechanical position settling time of a hybrid step motor. The energy-absorbing filter may have other applications, particularly where the mechanical oscillations of a motor can be reduced by the inclusion of a large capacitance.

BACKGROUND OF THE INVENTION

Motors are used in numerous fields including disk controllers, robotics, integrated circuit fabrication and many others. A typical motor causes movement in response to a command voltage or current. Oscillation about the desired position occurs when the motor nears the desired position. The size and duration of the oscillation are determined according to the characteristics of the motor such as damping. Clearly it is desirable to have this oscillation decay as rapidly as possible. However, minimizing the settling time of the oscillation decay may require a tradeoff in another area of motor performance such as motor efficiency or speed. Thus, a need exists in the motor art for a method or device to decrease motor settling time while maintaining or not significantly degrading the other motor characteristics.

SUMMARY OF THE INVENTION

The present invention provides an energy-absorbing filter technique for reducing mechanical motor oscillations by providing a large capacitance in parallel to the motor windings so as to cause the motor oscillations to be dissipated as resistive losses. Specifically, the energy-absorbing filter is used to provide a particular capacitance across a motor winding such that a virtual shunt is created. The virtual shunt causes the mechanical oscillations of the motor to be dissipated as resistive losses rather than being returned to the windings. This quickly damps the oscillations thereby reducing the settling time of the motor.

According to one aspect of the present invention, an energy-absorbing filter couples a capacitance to a winding of a motor to damp mechanical oscillations of the motor at the end of a move.

According to another aspect of the present invention, an energy-absorbing filter couples a capacitance to a winding of a motor to damp mechanical oscillations of the motor wherein an equivalent impedance of the energy-absorbing filter coupled with the motor is a substantially resistive.

In an embodiment, the motor may be a hybrid step motor and the filter may include a transconductance amplifier. In an embodiment, the filter may provide a shunt capacitance across the motor winding such that the mechanical oscillations are dissipated as resistive losses. The combined impedance of the filter and the motor are a substantially real resistance during the settling of the motor.

In an embodiment, the filter includes a positive resistive element, a negative resistive element, a complex impedance element, two amplifiers and a current sensor. The values of the resistors and the complex impedance element may be selected according to the electrical system parameters of the motor.

In an embodiment, the filter may be an ideal current regulator.

In an embodiment, the filter is one of a digital, analog, hybrid or software filter. In an embodiment, the filter reduces the settling time of the motor.

According to another aspect of the present invention, a method comprises measuring the electrical parameters of a motor, and setting the parameters of an energy-absorbing filter according to the electrical parameters of the motor such that the energy-absorbing filter reduces the mechanical oscillations of the motor at the end of a move.

In an embodiment, the energy-absorbing filter is a software filter.

In an embodiment, the parameters of the energy-absorbing filter are independent of motor inertia and motor load.

According to another aspect of the present invention, a method comprises including an energy-absorbing filter having filter characteristics with a motor having mechanical and electrical characteristics and selecting the filter characteristics such that an equivalent impedance of the motor and the energy-absorbing filter combined is substantially a purely resistive impedance.

In an embodiment, the filter characteristics may be selected according to the electrical characteristics of the motor. In an embodiment, the motor is a step motor. In an embodiment, the filter may be a digital, analog, hybrid or software filter. In an embodiment, the filter includes a transconductance amplifier. In an embodiment, the filter reduces the settling time of the motor.

The foregoing and other features of the invention are herein fully described and particularly pointed out in the claims. The following description and the annexed drawings setting forth in detail certain illustrative embodiments of the invention. These embodiments being indicative, however are but a few of the various ways in which the principles of the invention may be employed. Other objects, advantages, and novel features of the invention will become apparent from the following detailed description of the invention when considered in conjunction with the drawings.

DETAILED DESCRIPTION

Figure 1:
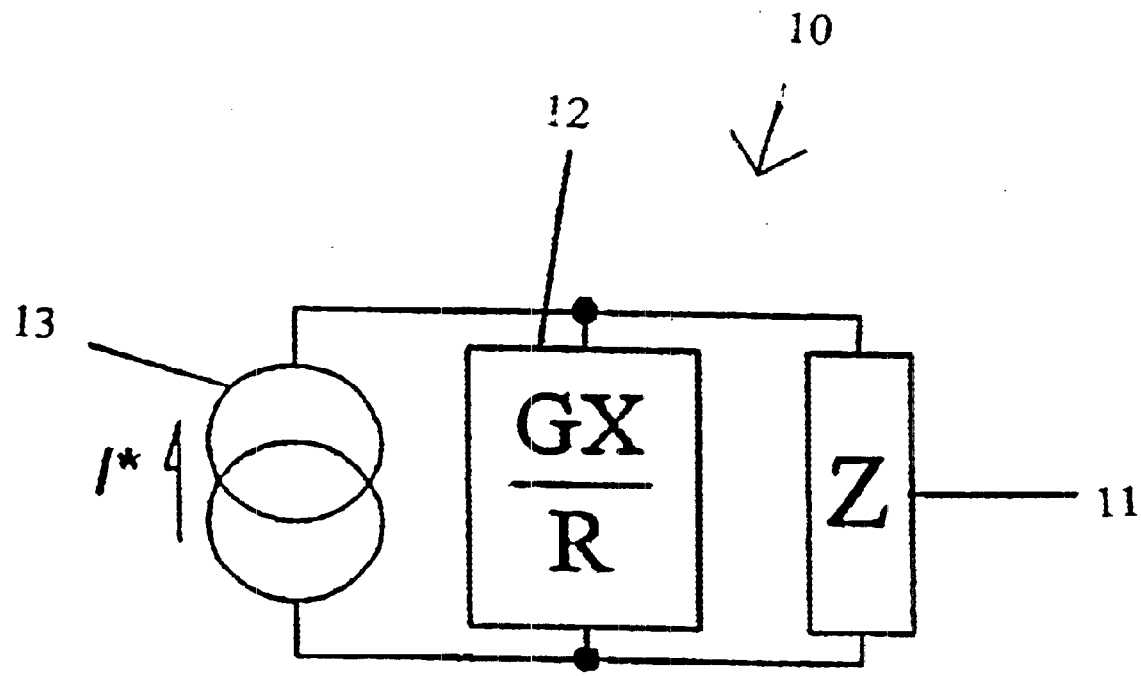
FIG. 1 is the Norton equivalent circuit representation of an embodiment of the present invention.

Referring now in detail to the drawings, in FIG. 1 shows a Norton equivalent circuit 10 of the present invention. As can be seen, the windings 11 are in parallel with an equivalent element 12 having an impedance of GX/R which is in parallel with the current source 13 of the command current I*. The impedance of GX/R, when properly selected, creates a substantially real equivalent impedance of the combined winding impedance Z and filter impedance GX/R. This substantially real equivalent impedance causes the mechanical oscillations to dissipate as resistive losses instead of returning the energy to the windings, thereby reducing motor settling time.

Specifically, the mechanical oscillations are dissipated as resistive losses when the resistive component of X equals $R/G \cdot R_{cu}$ and the imaginary component of X is capacitive and equals $-R/G \cdot (R_{cu}^2/L_0)$. ($L_0$ is the nominal self-inductance and $R_{cu}$ is the winding copper resistance.) The amplifier gain G is a constant based on drive parameters such as bus voltage and the relative values of X and R are chosen per the invention to meet the current regulator specifications for the motor.

Figure 2:
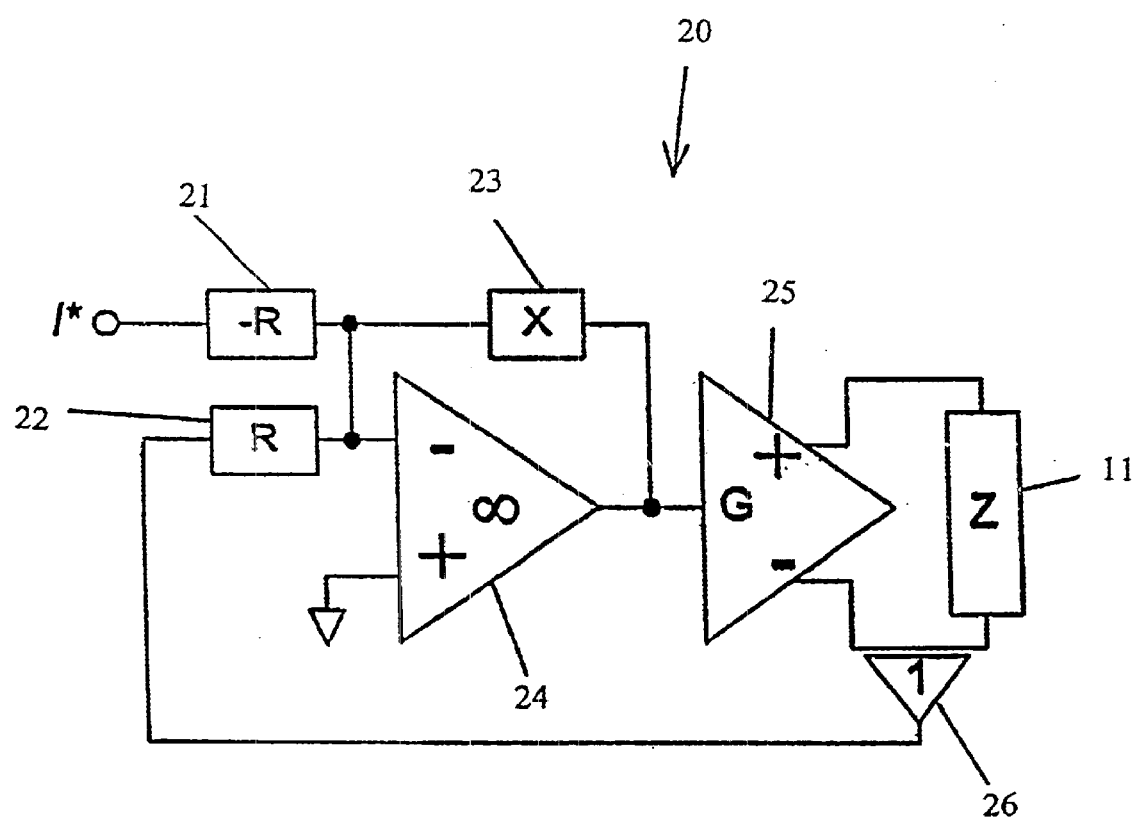
FIG. 2 is an embodiment of the energy-absorbing filter of the present invention.

FIG. 2 shows an exemplary energy-absorbing filter configuration 20 as implemented in a transconductance amplifier according to the present invention which improves the settling time by coupling an energy-absorbing filter 20 to the motor. A command current I* is input into a negative resistive element 21. The negative sign of the negative resistance element 21 simply indicates that the current is to be subtracted instead of added by the amplifier 24. For example, this can be implemented by an inverting amplifier. The output terminal of negative resistance element 21 is connected to a positive resistive element 22, a complex impedance element 23 having an impedance value of X and an amplifier 24 having infinite gain. The negative terminal of the output of amplifier 24 is connected to the other terminal of complex impedance element 23, both of which are connected to the output terminal of an amplifier 25 having a gain of G. The positive terminal of amplifier 25 is connected to one side of the winding 11 which has an impedance of Z. The negative terminal of amplifier 25 is connected to the opposite side of winding 11. A current sensor 26 is connected between the negative terminal amplifier 25 and the winding 11. A current feedback signal is output from current sensor 26 to the positive resistive element 22. The positive terminal of amplifier 24 is connected to ground. The values of the negative resistive element 21, the positive resistive element 22, the complex impedance element 23, and the gain of amplifier 25 are selected so as to compensate for the impedance of the winding 11. By compensating for the impedance of the winding 11, it is possible to reduce the mechanical oscillation of the motor and hence to reducing the settling time.

A simplified motor setup is possible as a result of the present invention since only the electrical parameters of the motor need to be known.

The values of X and R can be selected according to the electrical parameters of the motor without determining the mechanical parameters of the motor. (The selection of the values of X and R according to the mechanical system parameters is detailed in provisional patent application 60/010,871, the entire disclosure of which is incorporated by herein by reference.) Thus, there is no need to determine the load, the motor inertia, the motor stiffness, the motor torque constant or similar motor mechanical parameters. Furthermore, since the relevant electrical parameters do not change during operation, the values of G, X and R are fixed. However, G, X and R, if based upon the mechanical parameters, might not be fixed and would require adjustment when any of the corresponding mechanical parameters change.

Figure 3:
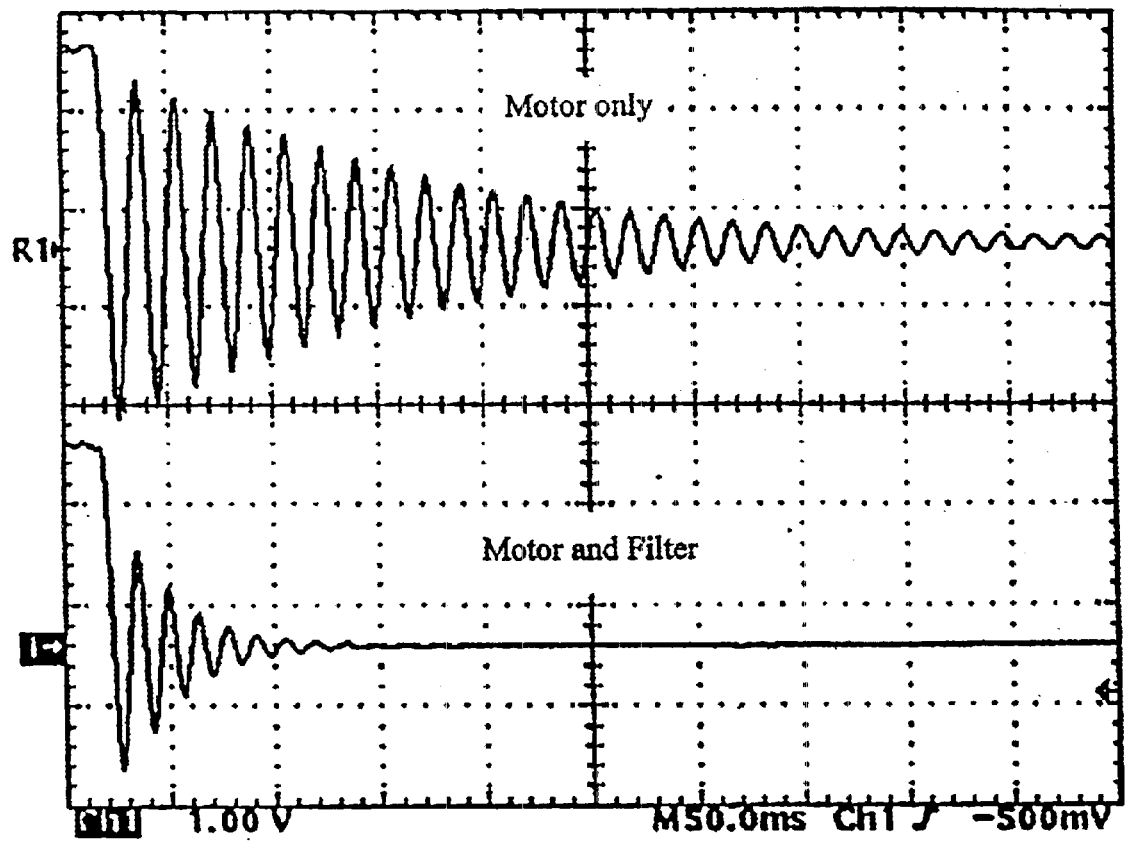
FIG. 3 is a comparison of the settling times of a motor with and without the present invention.

FIG. 3 shows a comparison between the settling time of a motor including an energy-absorbing filter of the present invention and the settling time of a motor lacking an energy-absorbing filter of the present invention. In this example, the motors used for the comparison include an energy-absorbing filter with an undamped motor having a $524 \times 10^{-6}$ Kg-m² inertial load. The energy-absorbing filter causes the oscillations of the motor to quickly decay to a steady state value. However, when the filter of the present invention is excluded, a slower decay of the oscillations occurs and a steady state value is not reached for a substantially longer period of time.

Figure 4:
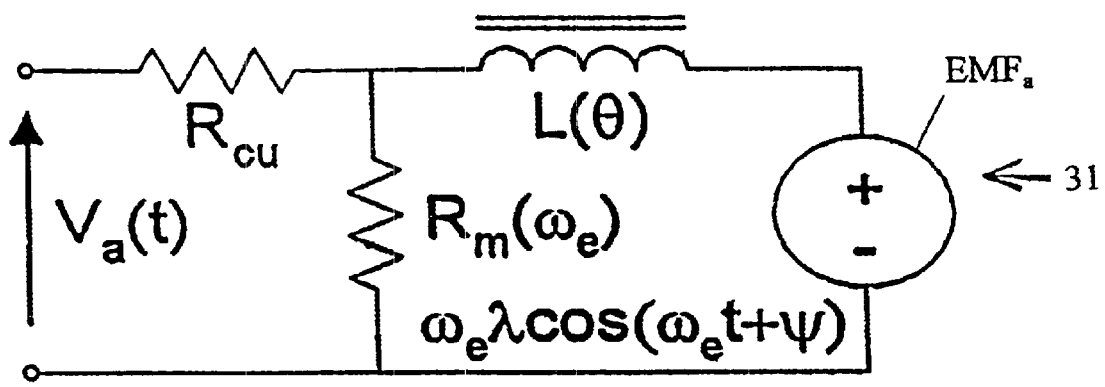
FIG. 4 is an equivalent circuit representation of a two-phase step motor winding motor.
Figure 4:
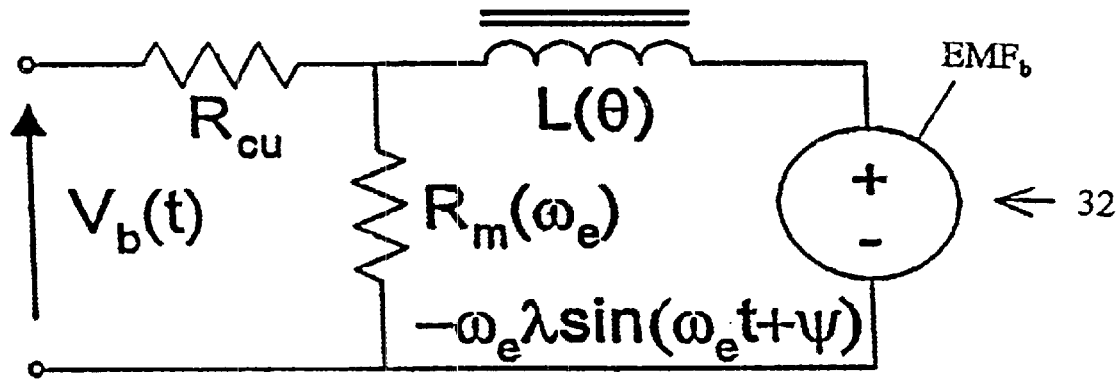

FIG. 4 shows a schematic model 30 of the windings of a two-phase step motor. The first phase winding 31 and the second phase winding 32 each have similar components. Specifically, equivalent winding circuits 31 and 32 include back electromotive forces $EMF_a$ and $EMF_b$, inductive components $L(\theta)$ and resistive components $R_{cu}$. The power in $EMF_a$ and $EMF_b$ is substantially the same as the mechanical power produced in the motor. Thus, the back EMF voltage sources $EMF_a$ and $EMF_b$ have voltages which are proportional to the flux linkage $\lambda$ and the speed $\omega_e$. The back EMF voltage $EMF_a$ varies according to $\cos(\omega_e t + \psi)$ while the back EMF voltage $EMF_b$ varies according to $-\sin((\omega_e t + \psi))$.

While the resistances $R_{cu}$ are a constant value, the inductance of each of the phases varies with position. The current through the first phase winding 31 is $I_0 \sin(\omega_e t)$ and the current through the second phase winding is $I_0 \cos(\omega_e t)$.

The electrical circuit, excluding magnetic losses from $R_m(\omega_e)$, is as follows:

$$\bar{v} = \begin{bmatrix} R_{cu} & 0 \\ 0 & R_{cu} \end{bmatrix} \bar{i} + \bar{L}\frac{d}{dt}\bar{i} + \omega_e \lambda \begin{bmatrix} \cos(\omega_e t + \psi) \\ -\sin(\omega_e t + \psi) \end{bmatrix} \quad (1)$$

where $$\bar{L} = \begin{bmatrix} L_0 + L_1\cos(2\theta_e + \psi) & M_{ab} \\ M_{ba} & L_0 - L_1\cos(2\theta_e + \psi) \end{bmatrix} \quad (2)$$

Since the filter helps bring the rotor to rest, the filter is utilized at lower speeds thus allowing the magnetic losses to be neglected.

Each stator pole piece of a two-phase motor is flanked by a positive and a negative pole piece of the opposite phase. By anti-symmetry, the flux contribution from each adjacent coil will be identical resulting in a zero mutual inductance since there is a zero net flux flow between the two phases. Furthermore, the saliency $L_1$ is typically much smaller than the nominal self-inductance $L_0$ and may be neglected. Thus, equation 2 reduces to the following:

$$\bar{L} = \begin{bmatrix} L_0 & 0 \\ 0 & L_0 \end{bmatrix} \quad (3)$$

By multiplying both sides of equation 1 by the winding current we get the total motor power produced:

$$\omega_e \lambda I_0 [\cos(\omega_e t + \psi)\sin(\omega_e t) - \sin(\omega_e t + \psi)\cos(\omega_e t)] = -\omega_e \lambda I_0 \sin(\psi) \quad (4)$$

Since the motor power is equal to the electromagnetic torque $T_e$ multiplied by velocity $\omega_e$, we can solve for the torque which is:

$$T_e = -\lambda I_0 \sin(\psi) \quad (5)$$

The mechanical equations of motion for an open loop step motor are a second order dynamic model having electrical position and electrical velocity state variables as follows:

$$\begin{bmatrix} \dot{\theta}_e \\ \dot{\omega}_e \end{bmatrix} = \begin{bmatrix} 0 & 1 \\ -\frac{N\lambda I_0}{J} & -\frac{Nb}{J} \end{bmatrix} \begin{bmatrix} \theta_e \\ \omega_e \end{bmatrix} + \begin{bmatrix} 0 & 0 \\ \frac{N\lambda I_0}{J} & -\frac{N}{J} \end{bmatrix} \begin{bmatrix} \theta^* \\ T_l \end{bmatrix} \quad (6)$$

In equation 6, J is the system inertia and b is viscous damping. Equation 6 assumes sin ($\psi$) is approximately equal to $\psi$ because the angles are small. The displacement angle $\psi$ equals the position error which is the actual torque angle $\theta$ less the commanded torque angle $\theta^*$. The electrical variables indicated by the subscript "e" are equal to the pole count N times the mechanical variables.

For the unloaded motor case ($T_1=0$), the motor is a second-order under-damped system having the following transfer function:

$$\frac{\theta(s)}{\theta^*(s)} = \frac{\omega_n^2}{s^2 + 2\zeta\omega_n(s) + \omega_n^2} \quad (7)$$

where the natural frequency of the motor $\omega_n$ and the damping ratio $\zeta$ are:

$$\omega_n = \sqrt{\frac{N\lambda I_0}{J}} \quad (8)$$

$$\zeta = \frac{b}{2}\sqrt{\frac{N}{J\lambda I_0}} \quad (9)$$

The placement of a capacitor and resistor in parallel to a winding is impractical as the capacitor would be as large as the motor. The impedance of a step motor at rest is essentially a series resistance and inductance. Thus, an embodiment including a filter of the present invention places a virtual shunt having a resistance and a capacitance in parallel to the resistance and inductance of the winding.

Figure 5:
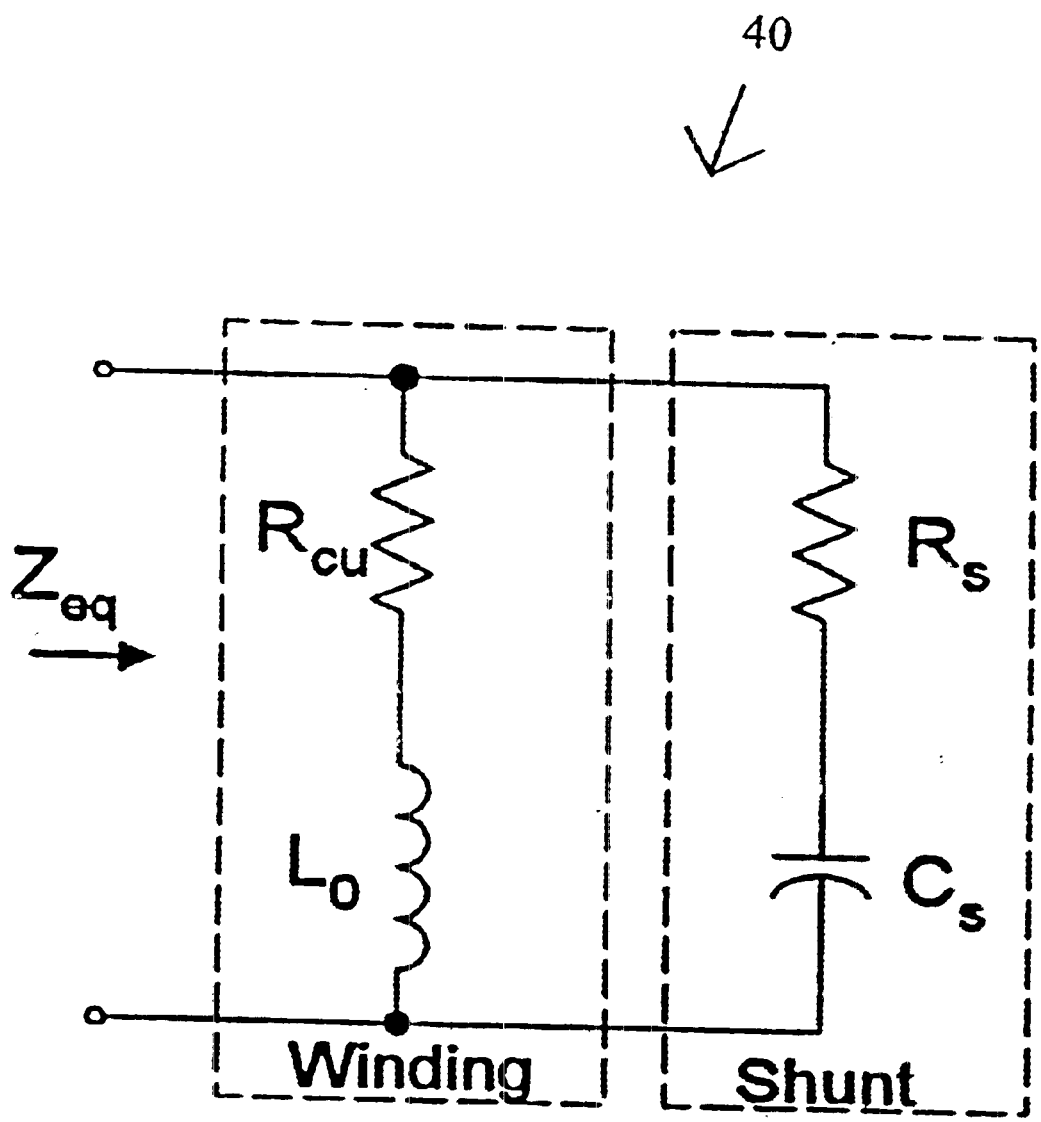
FIG. 5 is the shunt schematic representation of FIG. 1.

FIG. 5 is the shunt schematic representation 40 of the impedance of FIG. 1. The equivalent impedance $Z_{eq}$ equals a winding impedance in parallel with a shunt impedance. The winding impedance is the winding copper resistance $R_{cu}$ in series with the nominal self-inductance $L_0$. The shunt impedance is the shunt resistance $R_s$ in series the shunt capacitance $C_s$. Thus the equivalent impedance $Z_{eq}$ may be expressed mathematically as follows:

$$Z_{eq} = \frac{R_s\left(s^2 + \left(\frac{1}{R_sC_s} + \frac{R_{cu}}{L_0}\right)s + \frac{R_{cu}}{C_sR_sL_0}\right)}{s^2 + \frac{R_s + R_{cu}}{L_0}s + \frac{1}{C_sL_0}} \quad (10)$$

Ideally, $Z_{eq}$ should be purely resistive. To have a purely resistive equivalent impedance $Z_{eq}$, all of the terms containing "s" need to cancel. Cancellation occurs when the following two conditions are satisfied:

$$\frac{1}{R_sC_s} + \frac{R_{cu}}{L_0} = \frac{R_s + R_{cu}}{L_0} \quad (11)$$

When the conditions of equations 11 and 12 are satisfied, the shunt capacitance is:

$$C_s = \frac{L_0}{R_{cu}^2} \quad (13)$$

Thus, the equivalent impedance $Z_{eq}$ is:

$$Z_{eq} = R_{cu} \quad (14)$$

A typical step motor winding has an inductance around 10 mH, a series resistance around 1 $\Omega$ and a motor rating of several hundred volts. Thus, to have a purely real equivalent impedance $Z_{eq}$, the capacitor would have a capacitance of around 10 mF. Unfortunately, a 10 mF capacitor would be as large if not larger than the motor making the use of a real capacitor impractical. Thus, practical implementation requires using the energy-absorbing filter 20 of the present invention to provide the large capacitance and create the purely real impedance in $Z_{eq}$.

The parameters of the energy-absorbing filter 20 are set according to the nominal self-inductance $L_0$ and the winding copper resistance $R_{cu}$. Specifically, the impedance of the complex impedance element X has a real part Re(X) that corresponds to a resistance and an imaginary part Im(X) that corresponds to a capacitance as follows:

$$Re(X) = R/G \cdot R_{cu} \quad (15)$$

$$Im(X) = -R/G \cdot (R_{cu}^2/L_0) \quad (16)$$

Since G and R are purely real values without imaginary parts, the values of G and R may be such that Im(X) corresponds to a capacitance of a reasonably sized capacitor. For example, the capacitance might be chosen so as to readily fit onto a circuit board.

The energy-absorbing filter 20 of FIG. 2 is a current regulation loop with ideal current regulation. The response of the filter is as follows:

$$\frac{F(s)W(s)}{1 + F(s)W(s)} = \frac{1}{1 + s\frac{L_0}{R_{cu}}} \quad (17)$$

where $$W(s) = \frac{1}{R_{cu} + sL_0} \frac{\text{amp}}{\text{volt}} \quad (18)$$

$$F(s) = \frac{R_{cu}}{sL_0}(R_{cu} + sL_0)\frac{\text{volt}}{\text{amp}} \quad (19)$$

For a digital software filter using the Bilinear Transform $$s = \frac{2}{T}\frac{1 - z^{-1}}{1 + z^{-1}} \quad (20)$$

this is:

$$\frac{F(z)W(z)}{1 + F(z)W(z)} = \frac{1 + z^{-1}}{1 + \frac{2L_0}{TR_{cu}} + \left(1 - \frac{2L_0}{TR_{cu}}\right)z^{-1}} \quad (21)$$

The DC gain of the current loop is 1 and is found by setting s=0 in equation 17. Thus, the energy-absorbing filter provides ideal current regulation and full torque when the motor is at rest.

Additionally, the transfer function has a first order dynamic response based on the phase winding time constant.

For the typical values of 10 mH and 1 Ω there would be a bandwidth of only 15 Hertz. For a 50 pole step motor, this frequency corresponds to only 0.3 revolutions per second. The filter may be selectively coupled to the winding to avoid performance degradation when the motor speed $\omega_e$ is not small. Accordingly, this filter functions to bring the motor and load to rest.

For example, a series winding configuration of a Compumotor S83–93 step motor incorporating the present invention has a winding inductance of 15.5 mH and a resistance of 1.5 Ω. Thus, the energy-absorbing filter of the present invention has a shunt resistance of 1.5 Ω and a shunt capacitance of 6.9 mF.

Motor drives often include transconductance amplifiers. However, their function differs from the filter function of the present invention. For example, the gain of the transconductance amplifier in FIG. 2, expressed digitally, is:

$$\frac{a_0 + a_1 * z^{-1} + a_2 * z^{-2}}{1 + b_1 * z^{-1} + b_2 * z^{-2}} \quad (22)$$

where $b_1$ is typically around −0.98 and $b_2$ is typically around −0.02. While the values of $b_1$ and $b_2$ are not directly relevant to the present invention, the approximate values of $b_1$ and $b_2$ should be the same regardless of the motor used. However, $a_0$, $a_1$ and $a_2$ are relevant to the present invention. Coefficients $a_0$, $a_1$ and $a_2$ are much smaller in the filter of the present invention than the coefficients of transconductance amplifiers used for other purposes. For example, a non-filter transconductance amplifier has larger coefficient values (e.g., $a_0$=6.5877, $a_1$=−1.7519, and $a_2$=−3.2199) while the filter transconductance amplifier of the present invention has smaller coefficient values (e.g., $a_0$=0.2709, $a_1$=−0.269, and $a_2$=0).

The filter of the present invention may be an analog, digital or a hybrid filter, and may be formed from either electronic hardware or software. When the filter is formed by software, the motor is driven by a microprocessor, a digital processor, a DSP or other digital system.

The invention has been described above relation to a two-phase hybrid step motor. However, the present invention may be utilized with other kinds of motors, including, for example, 2-phase motor, a 3- or 5-phase motor could be used.

Although the invention has been shown and described with respect to certain preferred embodiment or embodiments, it is obvious that equivalent alterations and modifications will occur to others skilled in the art upon reading and understanding of this specification and the annexed drawings. In particular, regard to the various functions performed by the above described elements (components, assemblies, devices, etc.), the terms (including a reference to a "means") used to describe such elements are intended to correspond, unless otherwise indicated, to any element which performs the specified function of the described element (i.e., that is functionally equivalent) even though not structurally equivalent to the disclosed structure which preforms the function in the herein exemplary embodiment or embodiments of the invention. In addition, while a particular feature of the invention may have been described above with respect to only one or more several illustrated embodiment, such feature may be combined with one or other features or of other embodiments as may be desired and advantageous for any given or particular application.

We claim:

1. In a driver for a motor, a load invariant energy-absorbing filter including a transconductance amplifier that functions to provide a virtual shunt across the winding of a motor to damp mechanical oscillations of the motor at the end of a move.

2. The motor driver of claim 1, in combination with a hybrid step motor.

3. The motor driver of claim 1, wherein the energy-absorbing filter is a software filter.

4. The motor driver of claim 1, wherein the energy-absorbing filter is an ideal current regulator.

5. The motor driver of claim 1, wherein the energy-absorbing filter decreases a settling time of the motor.

6. The motor driver of claim 1, wherein the energy-absorbing filter is one of a hybrid filter, a digital filter and an analog filter.

7. In a driver for a motor, an energy-absorbing filter which couples a capacitance to a winding of a motor to damp mechanical oscillations of the motor at the end of a move, wherein the energy-absorbing filter includes a transconductance amplifier, and wherein the transconductance amplifier has a fixed gain selected such that energy of the mechanical oscillations transferred from the motor to the winding is dissipated as resistive losses.

8. In a driver for a motor, an energy-absorbing filter which couples a capacitance to a winding of a motor to damp mechanical oscillations of the motor at the end of a move, wherein the energy-absorbing filter has parameters that are independent of the load and inertia of the motor.

9. In a driver for a motor, an energy-absorbing filter which couples a capacitance to a winding of a motor to damp mechanical oscillations of the motor at the end of a move, wherein the energy-absorbing filter includes a positive resistive element, a negative resistive element, and a single complex impedance element, a first amplifier, a second amplifier, and a current sensor.

10. The motor driver of claim 9, wherein the values of the positive resistor element, the negative resistor element and the complex impedance element are selected according to electrical parameters of the motor.

11. In a driver for a motor, an energy-absorbing filter which reactively cancels an inherent reactance of a motor to damp mechanical oscillations of the motor at the end of a move, wherein an equivalent impedance of the impedance of the energy-absorbing filter coupled with an impedance of the motor is a substantially real impedance.

12. In a driver for a motor, a load invariant energy-absorbing filter which couples a capacitance to a winding of a motor to damp mechanical oscillations of the motor at the end of a move, the energy-absorbing filter is selectively coupled to the winding.

13. A method of reducing mechanical oscillations of a motor comprising the steps of:
   including an energy-absorbing filter having filter characteristics with a motor having mechanical and electrical characteristics; and
   selecting the filter characteristics according to only the electrical characteristics of the motor such that an equivalent impedance of the motor and the energy-absorbing filter combined is substantially a purely resistive impedance.

14. The method according to claim 13, wherein the motor is a step motor.

15. The method according to claim 13, wherein the energy-absorbing filter includes a transconductance amplifier.

16. The method according to claim 13, wherein the energy-absorbing filter is one of an analog filter and a digital filter.

17. The method according to claim 13, wherein the energy-absorbing filter is a software filter.

18. A method of selecting values of an energy-absorbing filter for a motor comprising:

measuring the electrical parameters of a motor; and setting the parameters of an energy-absorbing filter according to the electrical parameters of the motor such that the energy-absorbing filter has a characteristic of a transconductance amplifier that functions to provide a virtual shunt across the winding of a motor to damp mechanical oscillations of the motor at the end of a move.

19. The method according to claim 18, wherein the energy-absorbing filter is a software filter.

20. A load invariant energy-absorbing filter for a motor comprising:

an energy-absorbing filter which couples a capacitance to a winding of a motor to effect mechanical oscillations of the motor wherein an equivalent impedance of the energy-absorbing filter coupled with the motor is a substantially resistive.

21. The energy-absorbing filter according to claim 20, wherein the energy-absorbing filter includes a transconductance amplifier.

22. The energy-absorbing filter according to claim 21, wherein the transconductance amplifier has values selected such that energy of the mechanical oscillations transferred from the motor to the winding is dissipated as resistive losses.

23. The energy-absorbing filter according to claim 20, wherein the energy-absorbing filter is an energy-absorbing filter for a hybrid step motor.

24. The energy-absorbing filter according to claim 20, wherein the energy-absorbing filter has parameters that are independent of the load and inertia of the motor.

25. The energy-absorbing filter according to claim 20, wherein the energy-absorbing filter is a software filter.

26. The energy-absorbing filter according to claim 20, wherein the energy-absorbing filter includes a positive resistive element, a negative resistive element, and complex impedance element, a first amplifier, a second amplifier, and a current sensor.

27. The energy-absorbing filter according to claim 26, wherein the values of the positive resistor, the negative resistor and the complex impedance element are selected according to electrical parameters of the motor.

28. The energy-absorbing filter according to claim 20, wherein the energy-absorbing filter is an ideal current regulator.

29. The energy-absorbing filter according to claim 20, wherein the energy-absorbing filter decreases a settling time of the motor.

30. The energy-absorbing filter according to claim 20, wherein the energy-absorbing filter is one of a hybrid filter, a digital filter and an analog filter.

31. The energy-absorbing filter according to claim 20, the energy-absorbing filter is selectively coupled to the winding.

* * * * *